(12) United States Patent
Chetlur et al.

(10) Patent No.: US 10,902,369 B2
(45) Date of Patent: Jan. 26, 2021

(54) DETERMINING WORKING STYLE AND TRAITS

(71) Applicant: International Business Machines Corporation, Armonk, NY (US)

(72) Inventors: Malolan Chetlur, Bangalore (IN); Mukesh Kumar Mohania, New Delhi (IN); Vinay Kumar Reddy, Bangalore (IN); Bikram Sengupta, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 959 days.

(21) Appl. No.: 14/887,816

(22) Filed: Oct. 20, 2015

(65) Prior Publication Data

US 2017/0109682 A1    Apr. 20, 2017

(51) Int. Cl.
*G06Q 10/06* (2012.01)
*G06Q 10/10* (2012.01)

(52) U.S. Cl.
CPC ... *G06Q 10/06398* (2013.01); *G06Q 10/1053* (2013.01)

(58) Field of Classification Search
CPC .................................................. G06Q 10/06
See application file for complete search history.

(56) References Cited

U.S. PATENT DOCUMENTS 8,825,764 B2   9/2014 Nowak et al.
9,015,088 B2   4/2015 Shen et al.
2004/0030566 A1* 2/2004 Brooks Rix ....... G06Q 10/0639
                                                705/321
2006/0105306 A1   5/2006 Sisney et al.
2006/0184484 A1* 8/2006 Al-Otaibi .............. G06Q 10/06
                                                 706/45
2010/0100427 A1* 4/2010 McKeown ........... G06Q 10/067
                                                705/322
2012/0035987 A1* 2/2012 Anand ............. G06Q 10/06398
                                                705/7.42

(Continued)

OTHER PUBLICATIONS

Fuller, Ryan, "A Primer on Measuring Employee Engagement", Harvard Business Review, Nov. 17, 2014, 6 pages, Harvard Business Publishing, Boston, MA, USA.

(Continued)

*Primary Examiner* — Kurtis Gills
(74) *Attorney, Agent, or Firm* — Ference & Associates LLC

(57) ABSTRACT

Methods and arrangements for determining at least one employment trait of an individual from online activity. Collecting a plurality of employment task data points from a plurality of online sources, wherein each employment task comprises a data set indicative of a path taken by at least one individual from a starting point to an ending point, wherein the starting point and ending point are defined on the basis of common parameters. The collected plurality of employment task data points are assessed, to determine an employment trend of the individual and creating at least one profile of the individual based on the determined employment trend. At least one profile is stored at a data storage location. Other variants and embodiments are broadly contemplated herein.

19 Claims, 5 Drawing Sheets

(56) References Cited

U.S. PATENT DOCUMENTS

| | | | | |
|---|---|---|---|---|
| 2012/0185782 | A1* | 7/2012 | Storage | G06Q 10/087 |
| | | | | 715/757 |
| 2013/0311222 | A1* | 11/2013 | Chaturvedi | G06Q 10/06398 |
| | | | | 705/7.15 |
| 2014/0229214 | A1* | 8/2014 | Bernier | G06Q 10/0631 |
| | | | | 705/7.16 |
| 2014/0351155 | A1* | 11/2014 | Nikankin | G06Q 10/105 |
| | | | | 705/320 |
| 2015/0269244 | A1* | 9/2015 | Qamar | G06F 17/30598 |
| | | | | 705/7.42 |
| 2016/0260044 | A1* | 9/2016 | Sabet | G06Q 10/06398 |
| 2016/0260046 | A1* | 9/2016 | Cai | G06Q 10/06311 |

OTHER PUBLICATIONS

The Myers & Briggs Foundation—MBTI Basics, excerpted from the MBTI Manual: A Guide to the Development and Use of the Myers-Briggs Type Indicator from first publication, 1962, 3 pages. available at http://www.myersbriggs.org/my-mbti-personality-type/mbti-basics/ accessed on Jan. 20, 2016.

Herrmann, Ned, "The Theory Behind the HBDI and Whole Brain Technology", Herrmann International, Dec. 1, 1998, 5 pages, Lake Lure, North Carolina, USA.

Pulakos, Elaine D. et al., "Adaptability in the Workplace: Development of a Taxonomy of Adaptive Performance", Journal of Applied Psychology, 2000, pp. 612-624, vol. 85, No. 4, The American Psychological Association, Washington, DC, USA.

Cattell, Raymond B., "A Shortened 'Basic English' Version (Form C) of the 16 PF Questionnaire", The Journal of Social Psychology, 1956, 23 pages, vol. 44, Heldref Publications, c/o Taylor & Francis, Philadelphia, Pennsylvania USA.

* cited by examiner

DETERMINING WORKING STYLE AND TRAITS

BACKGROUND

Employees in an organization can be viewed as assets having a variety of strengths. Workplaces are now becoming increasingly knowledge-intensive, dynamic, and diverse. Due to these trends, organizations will increasingly value their employees who are able to adapt themselves to new work environments and continue to deliver value. The working style of an employee can be indicative of natural behavior, and the type of engagement or working style inherent to an individual can be exhibited during their job roles as well as their type of interaction with teams and peers. The working style of each employee can be dynamic and can vary with the experiences and skills that they have acquired during their working tenure. By using online footprints of each employee, an objective, data-driven way of assessing a person's working style and worker traits can be formalized. This analysis can greatly help an organization and can also greatly assist the employee as well.

Generally, in analyzing work patterns, a determination of the working style of an individual can be assessed by using indices such as an adaptability index as well as a reliability index. However, most models for determining work styles are quite subjective and usually are derived from questionnaire type indices. Using a system to monitor the activities of an employee and to determine an employee's working style will assist in determining the affinity between employee's exhibited working style and career objective requirements while also providing work-related training and career counseling. This use of an online activity footprint relating to the workplace can lead both the employee and the organization toward successful career paths and greater human resource management solutions on a multi-dimensional level.

BRIEF SUMMARY

In summary, one aspect of the invention provides a method of determining at least one employment trait of an individual from online activity, said method comprising: utilizing at least one processor to execute computer code that performs the steps of: collecting a plurality of employment task data points from a plurality of online sources, wherein each employment task comprises a data set indicative of a path taken by at least one individual from a starting point to an ending point, wherein the starting point and ending point are defined on the basis of common parameters; assessing the collected plurality of employment task data points to determine an employment trend of the individual; and creating at least one profile of the individual based on the determined employment trend; and storing the at least one profile at a data storage location.

Another aspect of the invention provides an apparatus for determining at least one employment trait of an individual from online activity, said apparatus comprising: at least one processor; and a computer readable storage medium having computer readable program code embodied therewith and executable by the at least one processor, the computer readable program code comprising: computer readable program code configured to collect a plurality of employment task data points from a plurality of online sources, wherein each employment task comprises a data set indicative of a path taken by at least one individual from a starting point to an ending point, wherein the starting point and ending point are defined on the basis of common parameters; computer readable program code configured to assess the collected plurality of employment task data points to determine an employment trend of the individual; and computer readable program code configured to create at least one profile of the individual based on the determined employment trend; and computer readable program code configured to store the at least one profile at a data storage location.

An additional aspect provides a computer program product for determining at least one employment trait of an individual from online activity, said computer program product comprising: at least one processor; and a computer readable storage medium having computer readable program code embodied therewith and executable by the at least one processor, the computer readable program code comprising: computer readable program code configured to collect a plurality of employment task data points from a plurality of online sources, wherein each employment task comprises a data set indicative of a path taken by at least one individual from a starting point to an ending point, wherein the starting point and ending point are defined on the basis of common parameters; computer readable program code configured to assess the collected plurality of employment task data points to determine an employment trend of the individual; and computer readable program code configured to create at least one profile of the individual based on the determined employment trend; and computer readable program code configured to store the at least one profile at a data storage location.

A further aspect of the invention provides a method comprising: collecting a plurality of employment task data points from a plurality of online sources; assessing the plurality of employment task data points, thereupon identifying from the plurality of employment task data points at least one profile based on a determined employment trend; and further identifying similarities based on a similarity measure, wherein the similarity measure establishes an employment match within the at least one individual profile and the requirements of at least one employment role.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
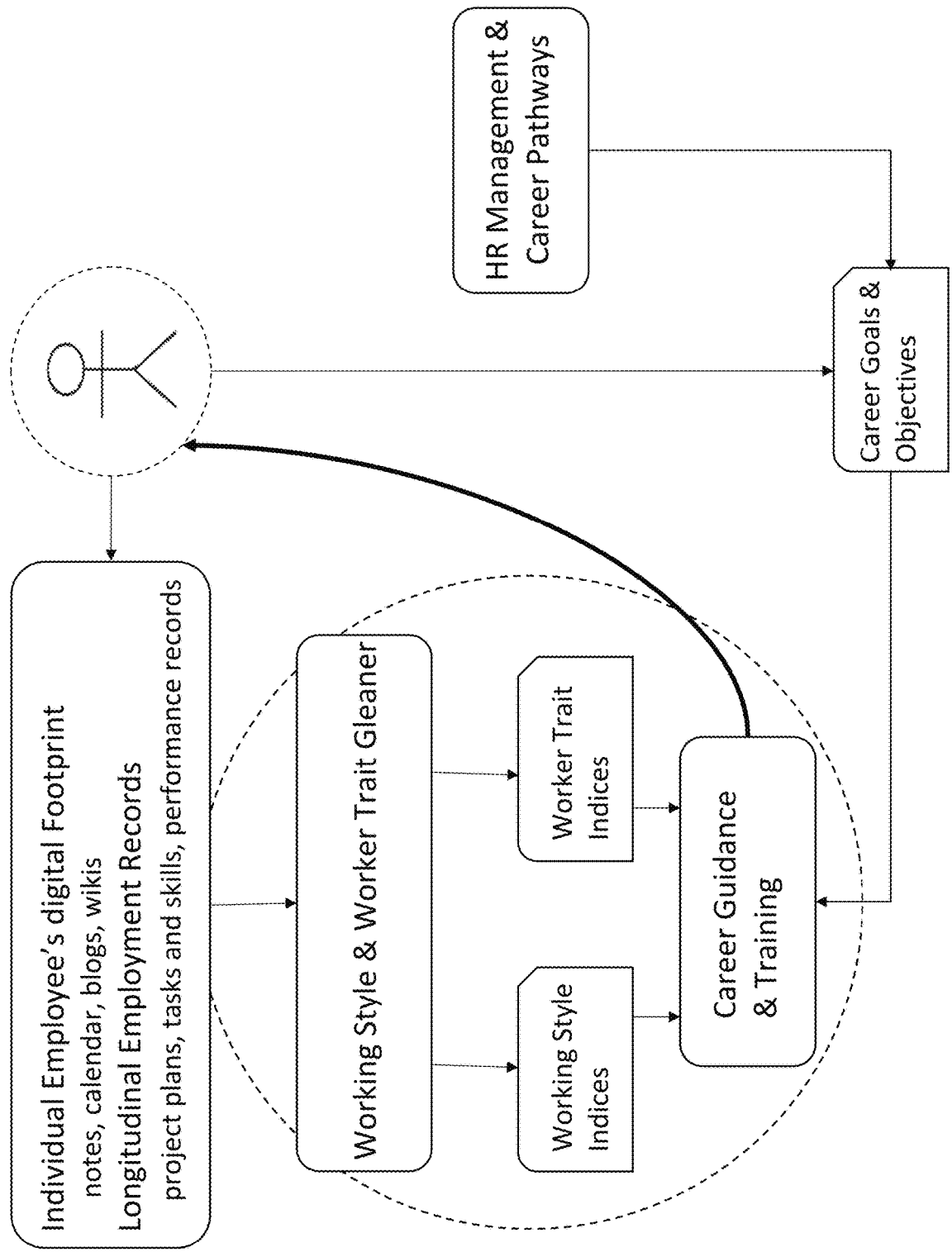
FIG. 1 schematically illustrates a system architecture for determining individual employee worker style profile.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made here below to FIG. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 5. In accordance with an exemplary embodiment, most if not all of the process steps, components and outputs discussed with respect to FIGS. 1-4 can be performed or utilized by way of a processing unit or units and system memory such as those indicated, respectively, at 16' and 28' in FIG. 5, whether on a server computer, a client computer, a node computer in a distributed network, or any combination thereof.

Broadly contemplated herein, in accordance with at least one embodiment of the invention, are methods and arrangements which provide automatic capturing of an employee's online activity during learning/training and working while employed. An individual's calendar schedules, meetings and appointment information are collected as well as a set list of projects and activities performed and the roles assumed. Different types of employee skills or traits are required for different types of roles in the work setting or the actual tasks that need to be executed by the employee. For example, leadership and delegation skills need to be identified in employees that take on managerial positions within the organization. Currently, in such employee identification methods, there are no automatic employee trait identification mechanisms used that do not include subjective question/answer engagement by the employee.

For ease of understanding, an example method of gathering employee online activity will be used. However, as can be understood by one skilled in the art, the use of embodiments as described herein can be used in other applications and systems. For example, an application requesting specific employee working style/trait profiles may use embodiments as described herein to securely access the requested information using a single source. This also provides a manner in which to gather the information using a single permission set. In other words, the employee or the employer only has to provide permission to a single source to collect the information rather than providing permission to multiple applications.

In accordance with at least one embodiment of the invention, there are broadly contemplated herein methods and arrangements, inter alia, for assessing worker traits and values. Adaptability to and proficiency in new technologies and processes are evaluated by using employment indices as well as an employee's ability to interact with others and across teams over time. Dependability indices can also be applied to determine how well the employee honors deadlines and commitments. Information can be collected from various sources of input and assigned to a common employee skill parameter. In other words, each task carried out by an employee will consist of a start parameter and an end parameter that correlates to indices of each specified task. The system, consisting of various methods to determine the working style and worker traits are valued within a range of 0 to 1. The system monitors the activities of an employee and determines the employee's exhibited working style on multiple dimensions and provides various indices to both the employee and the employer. The end result provides successful career and human resource management oversight. Solutions toward this end, and others, will now be appreciated from the ensuing discussion. The features discussed above, and others, relating to at least one embodiment of the invention, will be better appreciated from the discussion which follows.

In accordance with a general background relative to at least one embodiment of the invention, FIG. 1 schematically illustrates a general concept of determining various dimensions of working styles. Here, in a working environment scenario, an individual employee's digital footprint can be assessed by tracking online activity such as notes, calendars, blogs, etc. A working style and trait gleaner can be employed and combined with working style and trait indices to assist with career guidance and training Determination of a particular working style of an employee is similar to assessing a learning style in the area of cognition as each person will exhibit a specific working style profile just as they would a learning style profile. A working style of an employee may include, but is not limited to the contexts of: social style, delegation style, schedule style, tasking style, prioritization style, and strategy style. All of these working styles can be assessed by gleaning the employee task data points and applying the appropriate index or predetermined criteria to each specific type of task and the related data points. Such criteria, for example, could yield a subset of task data points specific to the employee and to the context of the job task. Based on the collection of these work style data points an employee profile can be created for each employee which can then be maintained in various devices by both the individual employee and the organization that employs the individual.

Each employee profile will contain information regarding the work style assigned to each employee by the specified indices to determine for example, the social style of work, and whether the employee is more comfortable working alone or in a group. A delegation style can also be determined, such as whether the employee delegates the work or prefers to work on the project alone for an extended period of time, even up to completion. Schedule style can also be determined in this manner. The individual can either follow a traditional work day schedule or follow any type of flexible schedule spread throughout the day. Strategy style of an employee can also be determined by the amount of detail an employee gives to each project as well as the amount of projected thought the employee shows throughout the project via email or other forms of online communication. Furthermore, by way of example, the task style of an individual can be determined by online documentation of how many tasks does the employee work on during the same work day; are they a multi-tasking individual or a single task-focused employee. The online activity approach of determining an employee's profile can also identify the priority style of an employee as well as their level of adaptability and reliability. Each task is based on providing a rank designation, in which an employment trend is indicated, between 0 and 1 for the employee's tasking style.

By way of further example, the employee digital footprint can be used by both the employee and the employer to contemplate future careers and consider objectives for career goals and also for career counseling and identifying career pathways suitable to the employee in a passive manner. In this system there is no active input regarding the assessment by the employee. The digital footprint is created in a system in which all work related data task entities are monitored and gleaned from the employee's workplace online activity, providing identified dimensions to both the employee and employer for easy understanding and possible follow-up action in the workplace scenario. This digital footprint profile will identify gaps between the exhibited style and expected style for the current role of the employee. The employee information can be gathered from the employee's computer devices and also smart devices in which work related data is input. The collected employee information can be grouped based on a similarity measure, wherein the similarity measure involves an identification of a relatedness of a particular task and style (context) with an identified employee.

Figure 2:
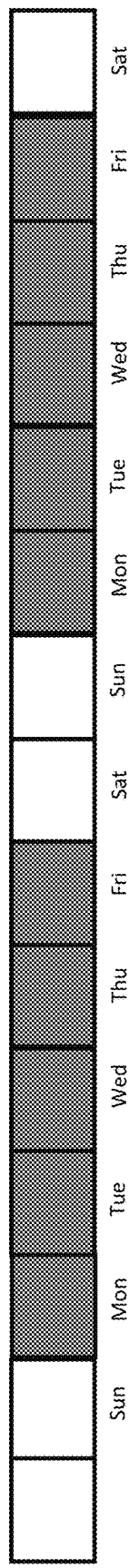
FIG. 2 schematically illustrates a heat map depicting employee work schedule habits.
Figure 2:
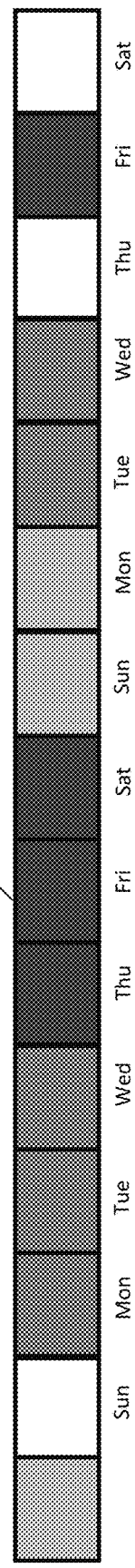

In accordance with at least one embodiment of the invention, an example of a determination of a worker trait in a particular context, e.g., is ascertaining whether the employee is a person that works many hours, works on the weekend, or works a traditional Monday through Friday schedule. This can be assessed by collecting the task data points related to an employee's working schedule as depicted in FIG. 2. This figure illustrates a heat map depicting employee work schedule habits. Heat map scenario 1, by way of example, illustrates, as is shown by the shaded area (201), a traditional work week consisting of a Monday through Friday schedule. The intensity of the black/grey shading is representative of the amount of activity. Heat map scenario 2 displays activities of work schedule not necessarily repeatable (202-darker grey/black intensity), but indicative of a non-traditional work schedule, much like that of a flex-time employee. Similar heat maps can be derived with the hour of day, week, month, etc. An employee's work schedule can be displayed through the tracking of online activities regarding task oriented objectives as entered by the employee. The intensity, or the time worked by the employee, is illustrated by the amount of black to grey shading, wherein the darker the color, the more task activity logged by the employee during a given time of a given day of the week. This activity may or may not be repeatable during any given schedule. The heat map generally is a log and timeline of activities performed by the employee. Based on the regularity of a particular schedule, a schedule style score can be assigned between 0 and 1. A higher weightage (60%) is assigned to recent past activities (schedule style score of projects with the last few months) and a lesser weightage is assigned to previous history of the employee activities.

Figure 3:
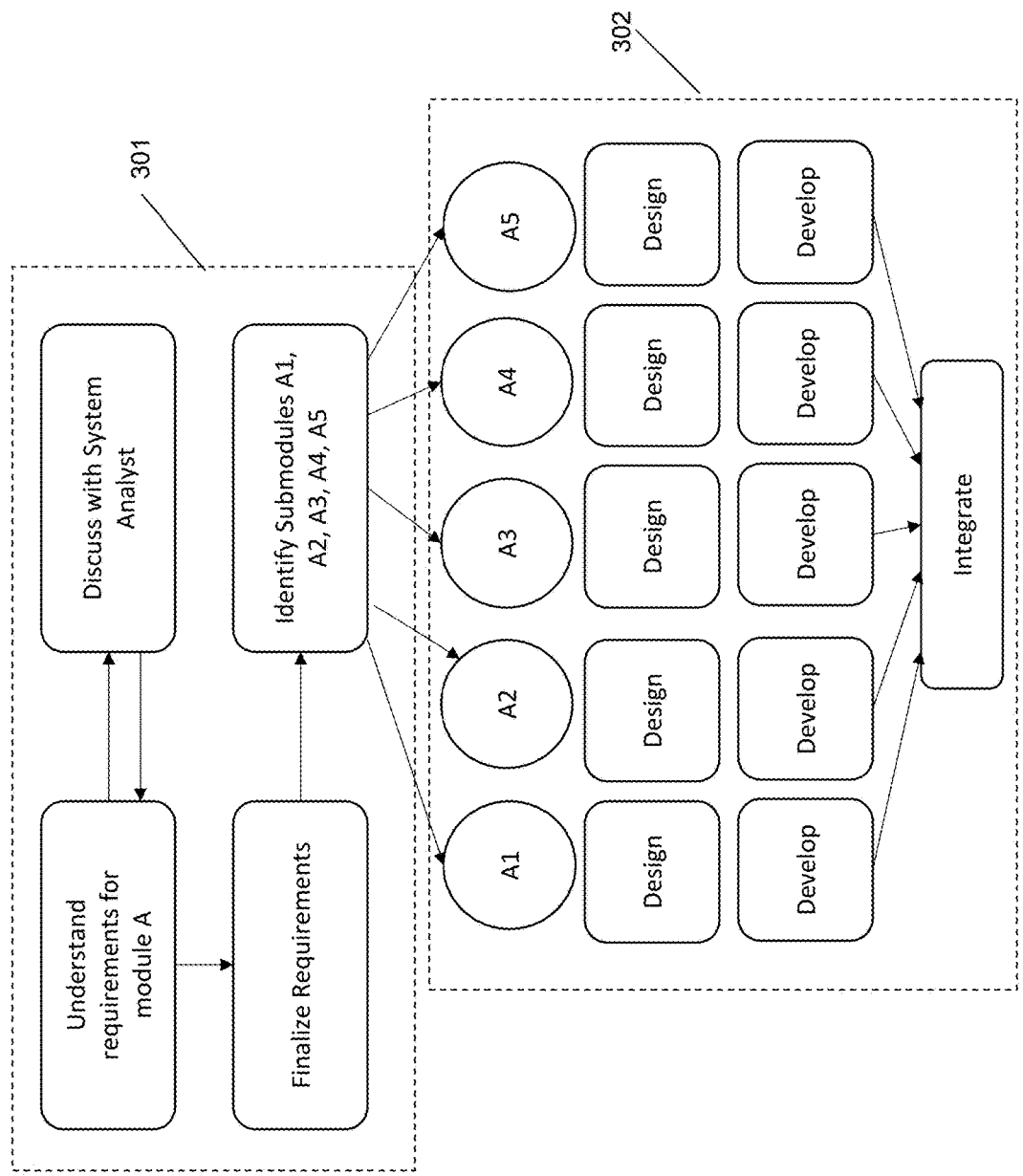
FIG. 3 schematically illustrates delegation working style determination method.

FIG. 3 schematically illustrates for purposes of example, a delegation working style determination method. The delegation or context style of an employee can be determined by mining the emails and project plans where request for ownership and assignment of ownership is determined by the individual delegating the work. FIG. 3 represents the related activities and sub-activities in a work-related project scenario and the ensuing dependency graph of such tasks in the project. As is illustrated in 301, the technical lead understands the requirements for the module A task, discusses them with a system analyst, and finalizes the requirements of the project; or the lead can identify sub-modules of module A and delegate the task to another employee as identified in 302. The task dependency graph of related activities and sub-activities is then determined. Determination of the number of nodes in the task dependency graph that are delegated is assessed as well as the determination of the number of times the tasks are delegated. Also, a determination of the context can be made, i.e., when an employee is busy and is required by time constraints to delegate tasks. The number of nodes and depth of the subtree delegate directly influence the delegation score. The main module and sub-module can be assigned with a higher and lesser score respectively. Based on the delegation opportunity in each activity and the delegated items, a delegation determination score between 0 and 1 can be assigned. A higher weightage (60%) is assigned to recent past activities (delegation style score of projects with the last few months) and a lesser weightage is assigned to previous history of the employee.

As such, there are broadly contemplated herein, in accordance with at least one embodiment of the invention, methods and arrangements for collecting employment task data points. At a very general level, FIG. 4 provides an overview of the main steps in a procedure broadly contemplated herein, with reference made to a work-related profile identified based on employment trends.

It can be appreciated from the foregoing that, in accordance with at least one embodiment of the invention, a technical improvement is represented at least via methods and arrangements for automatic determination of employment traits from workplace online activity. This can involve collecting a plurality of employment task data points and assessing and identifying profiles based on employment trends.

In accordance with at least one embodiment of the invention, very generally, quantitative values as determined herein, or other data or information as used or created herein, can be stored in memory or displayed to a user on a screen, as might fit the needs of one or more users.

Figure 4:
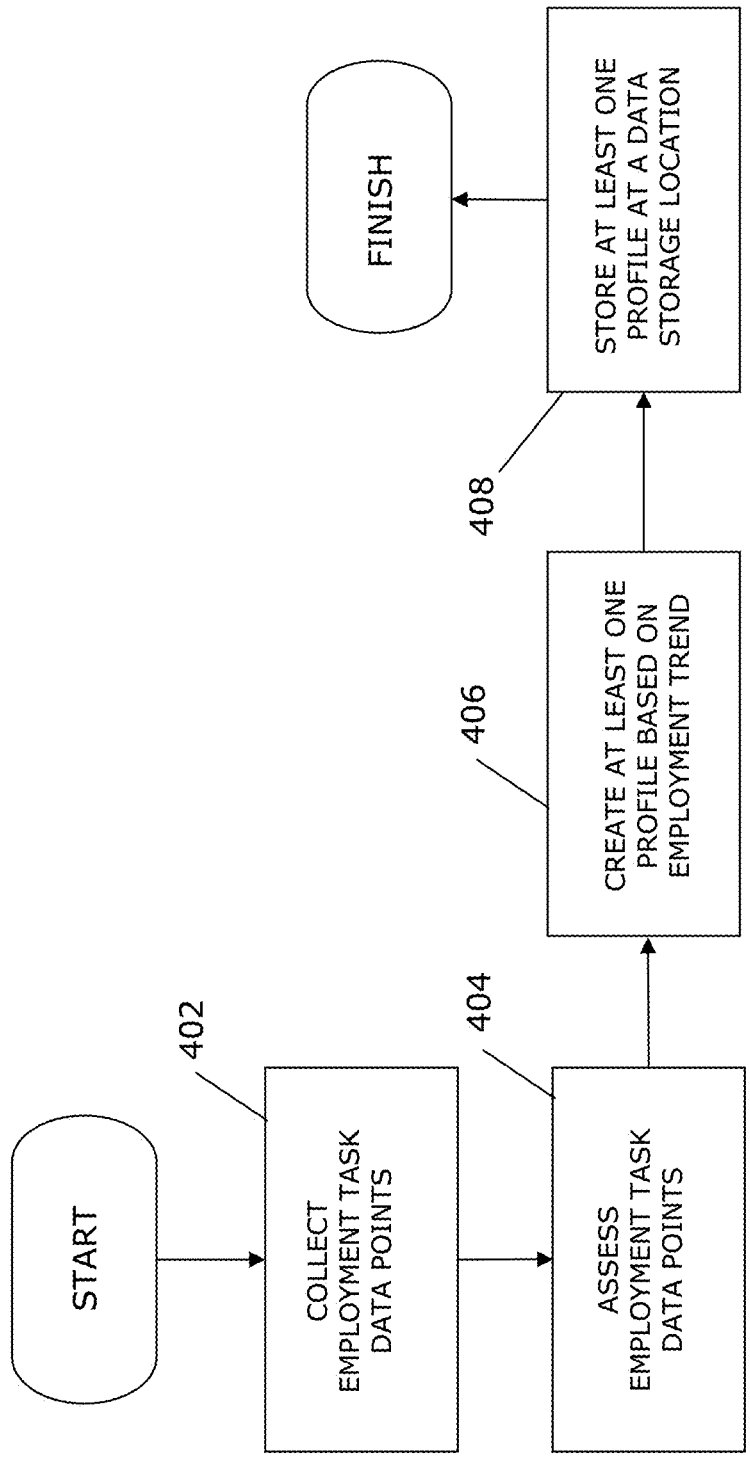
FIG. 4 sets forth a process more generally for determining an employment trait from workplace online activity.
Figure 5:
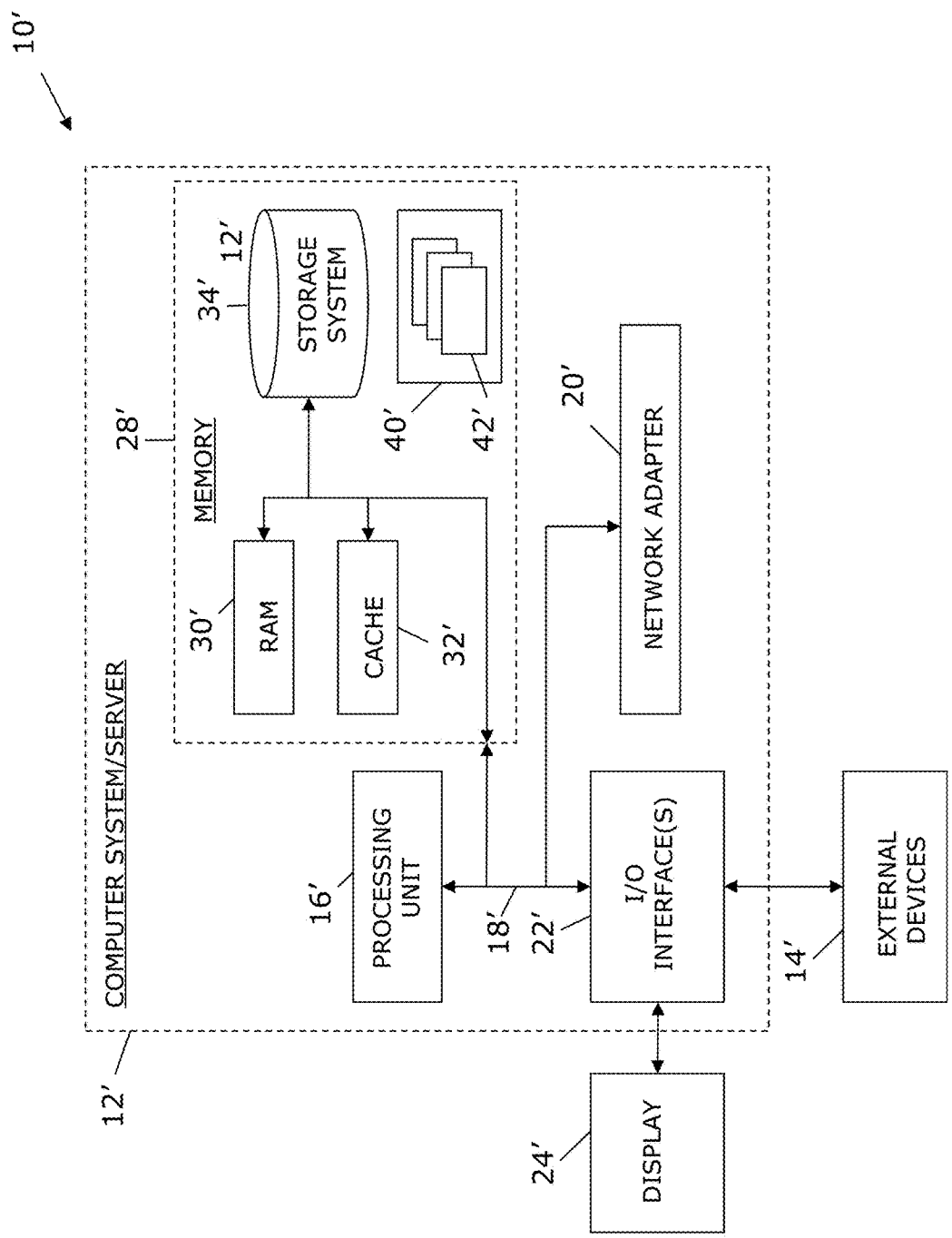
FIG. 5 illustrates a computer system.

It should be appreciated that a process, such as that broadly illustrated in FIG. 4, can be carried out on essentially any suitable computer system or set of computer systems, which may, by way of an illustrative and non-restrictive example, include a system such as that indicated at 12' in FIG. 5. In accordance with an example embodiment, most if not all of the process steps discussed with respect to FIG. 4 can be performed by way of a processing unit or units and system memory such as those indicated, respectively, at 16' and 28' in FIG. 5.

As shown in FIG. 4, in accordance with at least one embodiment of the invention, a plurality of employment task data points are collected, wherein each employment task comprises a data set indicative of a path taken by at least one individual from a starting point to an ending point (402). A plurality of employment task data points are assessed (404). There are identified, within the plurality of employment task data points, at least one profile based on a determined employment trend (406). The profiles are stored at a data storage location (408).

Referring now to FIG. 5, a schematic of an example of a computing node is shown. Computing node 10' is only one example of a suitable computing node and is not intended to suggest any limitation as to the scope of use or functionality of embodiments of the invention described herein. Regardless, computing node 10' is capable of being implemented and/or performing any of the functionality set forth hereinabove. In accordance with embodiments of the invention, computing node 10' may be part of a cloud network or could be part of another type of distributed or other network (e.g., it could represent an enterprise server), or could represent a stand-alone node.

In computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of determining at least one employment trait of an individual from online activity, said method comprising:
   utilizing at least one processor to execute computer code that performs the steps of:
   for an application requesting employee working style profiles using a single source having permission to collect information associated with the individual, identifying, using a trait gleaner, the information, wherein the information comprises at least a digital footprint associated with the individual, wherein the identifying the digital footprint comprises tracking, via accessing at least one device associated with the individual, at least one online activity engaged in by the individual;
   associating the at least one online activity with one or more working style contexts, wherein the associating comprises assessing task data points of the individual within the at least one digital footprint, applying an index to each type of task and corresponding task data points, and identifying at least one working style context for the individual by comparing the indexed type of task and corresponding task data points to the one or more working style contexts;
   assigning, based on an analysis of the individual's engagement with the at least one online activity, a quantitative value to each of the one or more working style contexts associated with the at least one online activity;
   assessing the quantitative values for each of the one or more working style contexts to determine an employment trend of the individual;
   updating the at least one digital footprint profile of the individual based on the determined employment trend and providing the updated at least one digital footprint profile to the application;
   comparing, using the application, the employment trend associated with the at least one digital footprint profile to a list of requirements for an organizational position;
   determining, using the application and based on the comparing, whether the individual is qualified for the organizational position; and
   providing, using the application and based on the determining, a notification associated with the individual's qualifications with respect to the organizational position.

2. The method according to claim 1, wherein said assessing comprises monitoring a plurality of workplace online activities in an individual or group interaction context.

3. The method according to claim 1, wherein said collecting comprises identifying, based upon predetermined criteria, employment data task points specific to at least one employment context of the individual.

4. The method according to claim 3, wherein the employment data task points specific to the at least one employment context are selected from the group consisting of: calendar activity, project activity, hourly working activity and email activity.

5. The method according to claim 1, wherein said assessing comprises assigning a score, based on a predetermined rank designation.

6. The method according to claim 5, wherein said assigning comprises utilizing current or past employment task data points.

7. The method according to claim 1, comprising creating a heat map, based upon criteria related to hourly working activity.

8. The method according to claim 1, wherein said creating comprises collecting task data points from multiple employment task types.

9. The method according to claim 1, wherein:
   the employment task data points from a plurality of online sources comprise employment task points indicative of employment paths; and
   the at least one profile is based on a determined employment trend.

10. The method according to claim 1, wherein said creating comprises obtaining at least one enriched profile comprising historical employment task data points.

11. An apparatus for determining at least one employment trait of an individual from online activity, said apparatus comprising:
    at least one processor; and
    a computer readable storage medium having computer readable program code embodied therewith and executable by the at least one processor, the computer readable program code comprising:
    for an application requesting employee working style profiles using a single source having permission to collect information associated with the individual, computer readable code that identifies, using a trait gleaner, the information, wherein the information comprises at least a digital footprint associated with the individual, wherein the identifying the digital footprint comprises tracking, via accessing at least one device associated with the individual, at least one online activity engaged in by the individual;
    computer readable program code that associates the at least one online activity with one or more working style contexts, wherein the associating comprises assessing task data points of the individual within the at least one digital footprint, applying an index to each type of task and corresponding task data points, and identifying at least one working style context for the individual by comparing the indexed type of task and corresponding task data points to the one or more working style contexts;
    computer readable program code that assigns, based on an analysis of the individual's engagement with the at least one online activity, a quantitative value to each of the one or more working style contexts associated with the at least one online activity;
    computer readable program code configured to assess the quantitative values for each of the one or more working style contexts to determine an employment trend of the individual;
    computer readable program code configured to update the at least one digital footprint profile of the individual based on the determined employment trend and providing the updated at least one digital footprint profile to the application;
    computer readable program code configured to compare, using the application, the employment trend associated with the at least one digital footprint profile to a list of requirements for an organizational position;

computer readable program code configured to determine, using the application and based on the comparing, whether the individual is qualified for the organizational position; and computer readable program code configured to provide, using the application and based on the determining, a notification associated with the individual's qualifications with respect to the organizational position.

12. A computer program product for determining at least one employment of an individual trait from online activity, said computer program product comprising:

at least one processor; and a computer readable storage medium having computer readable program code embodied therewith and executable by the at least one processor, the computer readable program code comprising:

for an application requesting employee working style profiles using a single source having permission to collect information associated with the individual, computer readable code that identifies, using a trait gleaner, the information, wherein the information comprises at least a digital footprint associated with the individual, wherein the identifying the digital footprint comprises tracking, via accessing at least one device associated with the individual, at least one online activity engaged in by the individual;

computer readable program code that associates the at least one online activity with one or more working style contexts, wherein the associating comprises assessing task data points of the individual within the at least one digital footprint, applying an index to each type of task and corresponding task data points, and identifying at least one working style context for the individual by comparing the indexed type of task and corresponding task data points to the one or more working style contexts;

computer readable program code that assigns, based on an analysis of the individual's engagement with the at least one online activity, a quantitative value to each of the one or more working style contexts associated with the at least one online activity;

computer readable program code configured to assess the quantitative values for each of the one or more working style contexts to determine an employment trend of the individual;

computer readable program code configured to update the at least one digital footprint profile of the individual based on the determined employment trend and providing the updated at least one digital footprint profile to the application;

computer readable program code configured to compare, using the application, the employment trend associated with the at least one digital footprint profile to a list of requirements for an organizational position;

computer readable program code configured to determine, using the application and based on the comparing, whether the individual is qualified for the organizational position; and computer readable program code configured to provide, using the application and based on the determining, a notification associated with the individual's qualifications with respect to the organizational position.

13. The computer program product according to claim 12, wherein the determining comprises monitoring a plurality of workplace online activities in an individual or group interaction context.

14. The computer program product according to claim 12, wherein the collecting comprises identifying, based upon predetermined criteria, employment data task points specific to at least one employed individual.

15. The computer program product according to claim 14, wherein the data points specific to the employed individual are selected from the group consisting of: calendar activity, project activity, hourly working activity and email activity.

16. The computer program product according to claim 12, wherein the assessing the plurality of employment task data points comprises assigning a score, based on a predetermined rank designation.

17. The computer program product according to claim 16, wherein the assigning of a score comprises utilizing current or past employment task data points.

18. The computer program product according to claim 12, comprising computer readable program code configured to create a heat map, based upon predetermined criteria, wherein the predetermined criteria are collected from said hourly working activity.

19. The computer program product according to claim 12, wherein the creating comprises obtaining at least one enriched profile comprising historical employment task data points.

* * * * *